May 12, 1936.    G. H. BARBER ET AL    2,040,423
FLASHLIGHT
Original Filed June 25, 1930    2 Sheets-Sheet 1

INVENTOR
GEORGE H. BARBER
GOODRICH B. PRATT
BY
Frederick Griswold, Jr.
ATTORNEY

May 12, 1936.  G. H. BARBER ET AL  2,040,423
FLASHLIGHT
Original Filed June 25, 1930  2 Sheets-Sheet 2
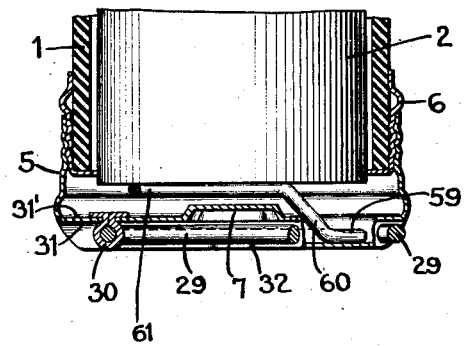
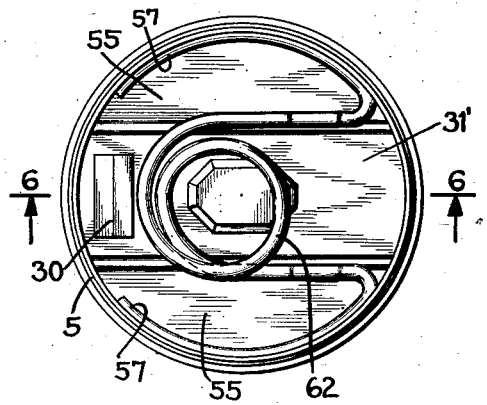
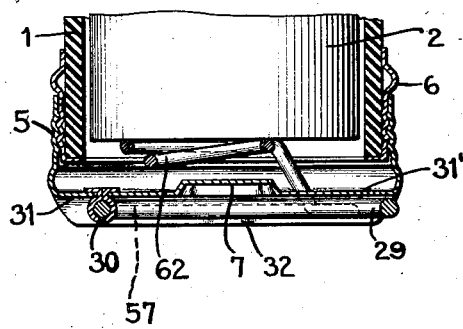
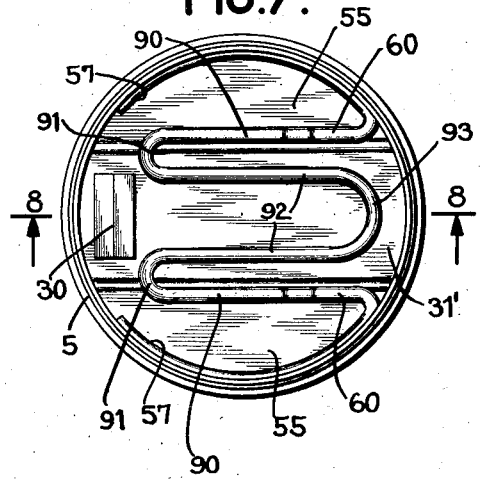
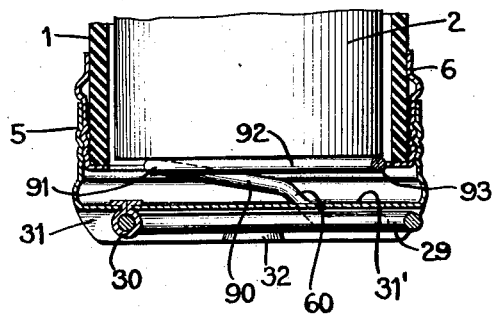
INVENTOR
GEORGE H. BARBER
GOODRICH B. PRATT
BY
ATTORNEY Patented May 12, 1936

2,040,423

UNITED STATES PATENT OFFICE 2,040,423

FLASHLIGHT

George H. Barber, New Rochelle, N. Y., and Goodrich B. Pratt, Grantwood, N. J., assignors to Bond Electric Corporation, Jersey City, N. J., a corporation of Delaware Original application June 25, 1930, Serial No. 463,642. Divided and this application June 29, 1932, Serial No. 619,850

5 Claims. (Cl. 240—10.66)

This invention relates to electric flashlights and hand lanterns of the kind in which the electrolytic cell or a battery of such cells is carried within the flashlight casing and an end of such casing is closed by a removable bottom cap, so-called.

This application is a divisional application of United States Serial No. 463,642 filed June 25, 1930.

One object of the present invention is to avoid the use of springs or other loose or removable parts in the bottom cap. Accordingly, the cap has an inwardly pressed portion adapted to engage and form an electrical contact with the battery.

Another object of the invention is to provide a bottom cap for flashlights which shall be strengthened and capable of retaining its shape to a greater degree if the flashlight is struck, as when falling, on the bottom cap.

In accordance therewith, the bottom cap has its bottom surface pressed inwardly to form therewithin an elongated raised portion, conveniently on a diameter and, if desired, substantially from side to side so as to form, in effect, a strengthening rib.

The invention also seeks to provide an improved form of resilient battery positioning and shock absorbing element for the bottom cap.

It is also an object of the invention to provide a flashlight bottom cap and battery positioning shock absorbing device therefor in which the cap is so constructed and arranged as to definitely locate the battery positioning and shock absorbing device against displacement. To this end a coiled resilient battery positioning member is disposed within the bottom cap whereof both ends engage the bottom cap and this battery positioning member has, preferably, a U-shaped center portion which may, if desired, be coiled or reversely bent so that each successive or reverse bend takes up the shock and offers resistance to the compressive forces as the positioning element is compressed and each device is conveniently so related to the bottom cap that the inwardly pressed reinforcing member is engaged thereby and serves as a final or shock resisting member.

The invention also seeks a bottom cap and battery positioning and shock absorbing element which is practical from the standpoint of simplicity and cheapness of manufacture and convenience and durability of operation.

These and other objects of the invention and the means for their attainment will be more apparent from the following detailed description, taken in connection with the accompanying drawings illustrating embodiments by which the invention may be realized, and in which:—

Figure 4 is a sectional view of the bottom cap taken as on the line 4—4 of Figure 3, but illustrating the bottom cap on a flashlight casing, the battery positioning spring being shown bearing against the bottom of a battery;

Figures 5 and 6 are views similar to Figures 3 and 4, but showing a modified construction of battery positioning spring;

Figure 7 is a view looking into a bottom cap and showing a modified form of the bottom cap spring illustrated in Figures 3 and 5; and Figure 8 is a view in vertical section showing the spring of Figure 7 thrusting against the bottom of a battery.

Figure 1:
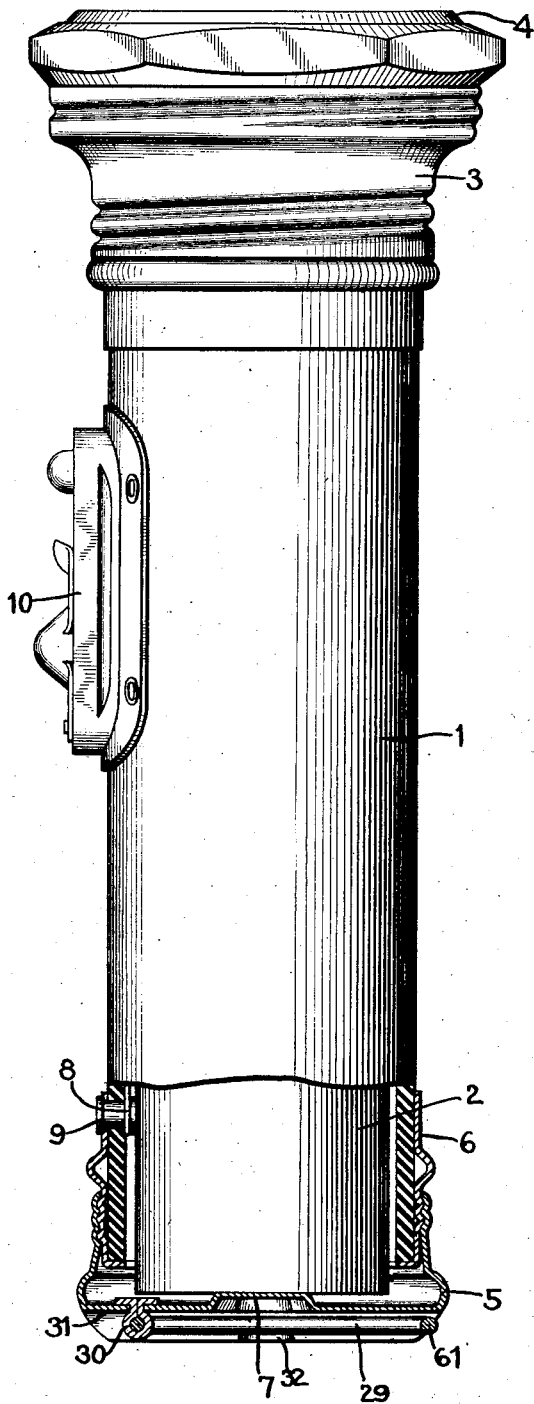
Figure 1 is a view showing, in side elevation, a flashlight embodying this invention, parts of the casing being sectioned to disclose the entire construction.
Figure 2:
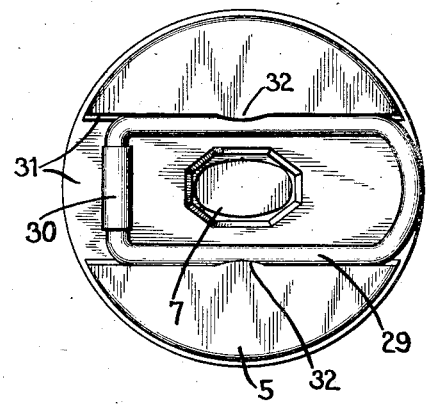
Figure 2 is an underneath plan of the bottom cap of the flashlight.
Figure 3:
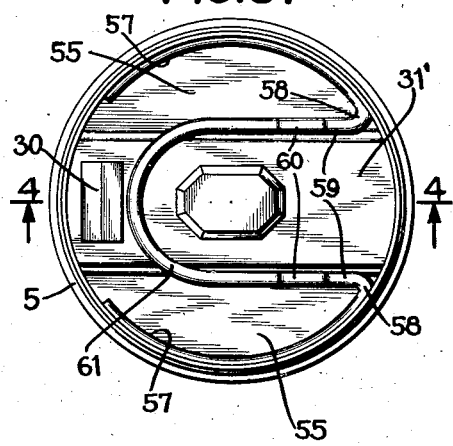
Figure 3 is a view of a bottom cap similar to that illustrated in Figures 1 and 2, in plan, showing the interior with a battery positioning spring therewithin.

Referring first to Figure 1, the reference numeral 1 indicates the body portion or casing of the flashlight, the same being shown, in the present disclosure, as cylindrical and of insulatory material although the invention is also applicable to a metallic casing. The casing 1 is adapted to receive a dry cell or battery 2, which also is preferably cylindrical and of a size substantially fitting within the cylindrical casing 1 with an appropriate clearance circumferentially. At what may be termed the upper end of the flashlight, there is shown a hood 3 containing the reflector and source of illumination, and supporting a lens 4, as by the lens ring, the hood being threaded on a threaded hood collar substantially similar to the threaded bottom cap collar 6 on which is threaded the bottom cap 5 provided at the other end of the casing 1 for closing and holding the dry cell in place. The bottom cap 5, furthermore, is of suitable metal and has an indentation 7 so as to obtain positive engagement with the shell or zinc cup of the dry cell and form, in effect, a contact portion 7, said shell constituting one of the electrodes of the dry cell and the construction thereby obtaining electric connection between the electrode and the collar 6. Obviously, in lieu of the indentation 7, a suitable metallic member may be secured on the inside of the cap for a contact portion 7. A suitable contact strip 8 or other electrical connection extends along the inside of the casing 1, being connected at its lower end as by rivet 9 with the bottom cap collar 6, and being connected at its other end in any convenient manner, not shown, with a suitable circuit closing device such as a switch 10, the circuit being completed in any convenient manner well known to those skilled in the art.

To support the flashlight upon a hook or elsewhere, there is shown an elongated suspension ring 29 pivoted to the bottom cap 5 within a transverse groove 31, by means, say of a hinge member 30 the inner ends of which pass through a slot in the bottom of the cap and are bent over on the inside to thus provide an outer loop to receive the ring 29. Obviously other means of pivoting the ring hanger within the walls of the groove are equally within the purview of the invention. The longitudinal depression 31 which receives the ring has overlying ears 32 at convenient points to frictionally engage the ring for holding the same within the said depression 31. However, the ring will have sufficient resiliency so that it can be snapped past the ears and thus swung either into open position or snapped back into closed position. The bottom of this groove 31 has a depression 7 formed therein which provides a convenient contact for the bottom of the battery 2 in the modification illustrated in Figure 1, as hereinbefore described.

In some situations, it may be found desirable to provide the flashlight with a yielding battery positioning element in its lower end. An improved spring for such purpose is shown in Figures 3 through 8. In the illustrated embodiment, the transverse groove 31 is rectangular in cross section and separates the base of the cap into two segmental portions. Now considering the base of the cap as viewed from the inside, the groove 31 forms a substantially rectangular elevated portion 31' defining two spaced segmental depressions 55. Obviously the elevated portion 31' may be formed by a separate piece inserted in the bottom cap. A resilient metallic rod, strip or wire has its ends 57 bent preferably on the arc of a circle to form spaced resilient bottom cap engaging portions adapted to be disposed within the segmental depressions 55 and engage the inner periphery of the bottom cap. Inwardly of each end, the wire is reversely bent, as at 58, and is formed with short substantially parallel portions 59 adapted to lie in the depressions 55 along the sides of the dividing portion 31' against the side walls of which they are pressed by the spring action of the arcuate parts 57. It will be noted that the bends are so made as to lie in the corner formed by the elevated part 31' and the wall of the cap, which portion is the strongest part of the cap by reason of the construction and is thus particularly suited to receive the thrust of the battery transmitted through the spring. The portions 59 are deflected upwardly, forming the angularly disposed portions, 60, to join a U-shaped battery engaging part 61, Figure 4, forming the mid-portion of the wire. Obviously, in the interest of greater resiliency, the mid-portion may be formed into one or more coils 62 as shown in Figures 5 and 6.

Another form taken by the spring is shown in Figures 7 and 8. In this instance the upwardly directed portions 60 are continued in a generally upward direction as at 90, but at a more acute angle. The parts 90 are parallel and of a substantial length extending preferably nearly across the bottom cap. These arms 90 are reversely bent as at 91 to form parallel upper arms 92 also preferably extending upwardly at an angle to the base of the bottom cap nearly across the bottom cap where they are connected by the curved part 93. The parts 92 and 93 form a U-shaped battery engaging part. The spring, as a whole, forms in effect a double cantilever thrust member as distinguished from the single cantilever thrust member previously described. There is, thus, a double amount of compression before the cell goes down hard against the bottom cap because the U-shaped part 92, 93 is first depressed to, say, the horizontal position shown in Figure 8, whereafter the arms 90 are depressed until the end 93 rests on the raised part 31' and this latter depression is resisted by the inherent resiliency of the portions 90 and 60.

The bottom cap spring serves not only to protect the batteries from injury and, working in conjunction with the top shock absorber spring to form a yielding cradle for the battery, but also to absorb the shock of the batteries in the event the flashlight is dropped bottom downward and distributes this shock to the bottom cap in such a way that the cross channel 31' of the bottom cap, which carries the ring hanger 29 is not distorted and continues to function with the hanger in the desired manner.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawings, except as indicated in the appended claims.

What is claimed is:—

1. In a flashlight having a battery and a bottom cap provided inwardly with a substantially diametrically disposed raised portion having sides, a battery positioning element having arcuate ends to yieldingly engage the inner periphery of the bottom cap at its bottom, reversely bent portions connected with the ends, respectively, and yieldingly engaging the sides of the raised portion of the bottom cap, angularly disposed portions connected with the bent portions, respectively, and a substantially U-shaped portion connected with the last named portions to engage the battery and offset from the ends.

2. In a flashlight having a battery and a bottom cap provided inwardly with a substantially diametrically disposed raised portion having sides, a battery positioning element having arcuate ends to yieldingly engage the inner periphery of the bottom cap at its bottom, reversely bent portions connected with the ends, respectively, and yieldingly engaging the sides of the raised portion of the bottom cap, angularly disposed portions connected with the bent portions, respectively, and a substantially U-shaped portion connected with the last named portions to engage the battery and offset from the ends, the curved part of the U-shaped portion being formed into a coil.

3. In a flashlight having a battery and a bottom cap provided inwardly with a substantially diametrically disposed raised portion having sides, a battery positioning element having arcuate ends to yieldingly engage the inner periphery of the bottom cap at its bottom, reversely bent portions joined to said ends, respectively, and yieldingly engaging the sides of the raised portion of the bottom cap, angularly disposed portions joined to said reversely bent portions, respectively, and a substantially U-shaped portion to engage the battery and offset from the ends, the arms of said U-shaped portion being respectively joined to said angularly disposed portions.

4. In a flashlight having a battery and a bottom cap provided inwardly with a substantially diametrically disposed raised portion having sides, a battery positioning element having arcuate ends to yieldingly engage the inner periphery of the bottom cap at its bottom, reversely bent portions joined to said ends, respectively, and yieldingly engaging the sides of the raised portion of the bottom cap, angularly disposed portions joined to said reversely bent portions, respectively, and a substantially U-shaped portion to engage the battery and offset from the ends, the arms of said U-shaped portion being respectively joined to said angularly disposed portions, the curved part of the U-shaped portion being formed into a coil.

5. In a flashlight having a battery and a bottom cap provided inwardly with a substantially diametrically disposed raised portion having sides, a battery positioning element having arcuate ends to yieldingly engage the inner periphery of the bottom cap at its bottom, reversely bent portions joined to said ends, respectively, and yieldingly engaging the sides of the raised portion of the bottom cap, angularly disposed portions joined to said reversely bent portions, respectively, and a substantially U-shaped portion to engage the battery and offset from the ends, the arms of said U-shaped portion being respectively joined to said angularly disposed portions by reversely curved portions.

GEORGE H. BARBER.
GOODRICH B. PRATT.